(12) United States Patent
Bahl

(10) Patent No.: US 6,782,398 B1
(45) Date of Patent: Aug. 24, 2004

(54) METHOD FOR EXECUTING COMMANDS ON MULTIPLE COMPUTERS OF A NETWORK

(75) Inventor: Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 09/593,569

(22) Filed: Jun. 14, 2000

(51) Int. Cl.[7] .......................... G06F 12/00; G06F 15/16
(52) U.S. Cl. ..................... 707/200; 707/201; 709/200; 709/201; 709/202; 709/207
(58) Field of Search ............................... 707/1–3, 6, 110, 707/100, 101, 200, 513; 717/100, 106, 120, 171; 709/200, 100, 202, 223; 715/513

(56) References Cited

U.S. PATENT DOCUMENTS 6,442,748 B1 * 8/2002 Bowman-Amuah ..... 707/103 R
6,453,362 B1 * 9/2002 Bittinger et al. ............ 709/316

OTHER PUBLICATIONS

Northrup, Anthony, *Chapter 11, Windows Internet Naming Service*, (1998) pp. 281–298, NT Network Plumbing, IDG Books, Worldwide, Inc., Foster City, CA.

DB2 Replication Certification Guide, *Chapter 1. An Overview of DB2 Data Replication*, pp. 1–33.

* cited by examiner

Primary Examiner—Alford Kindred
(74) Attorney, Agent, or Firm—Leydig, Voit & Mayer, Ltd.

(57) ABSTRACT

A method for executing commands on multiple computers of a network is provided in which a command may be entered at one computer, replicated, and sent to other computers of the network. Each computer receiving the replicated command may also repeat the replication process and sent the command to still other computers. The command may be stored and replicated in conjunction with the replication of entries or records of a database. When one computer update another computer as to the changes made to its individual copies of the database, it transmits a replication message to the other computer. When the other computer receives the replication message, it may store the command in a record of its copy of the database and, if appropriate, execute it. A record type field may be used to distinguish command records from other types of database records. An execution task may periodically search a computer's copy of the database for command records whose execution times are current and, if such records are found, execute the commands contained therein on the computer.

44 Claims, 17 Drawing Sheets

US 6,782,398 B1

METHOD FOR EXECUTING COMMANDS ON MULTIPLE COMPUTERS OF A NETWORK

TECHNICAL FIELD OF THE INVENTION

This invention relates generally to controlling network computers and, more particularly, to executing commands on multiple computers of a network by propagating the commands through the network using a replication scheme.

BACKGROUND OF THE INVENTION

Maintaining multiple computers of a network has always been a cumbersome task for network administrators. It often requires an administrator to enter the same command or set of commands at each of the computers. The administrator can accomplish this manually, or he or she can do it remotely by establishing simultaneous communication links to each of the computers and transmitting the commands to all of them. The first method, however, is very time consuming especially when the number of computers is large. For example, some networks include may include hundreds or thousands of computers.

The second method is cumbersome and prone to errors. For example, if one or more of the computers is down or inaccessible, then the administrator will be forced to try again at a later time. Each attempt involves running a script over the network, and this can consume a considerable amount of bandwidth. If, on the other hand, the administrator forgets to retry, then inconsistencies between the computers that have executed the command and those that have not will result. Thus, it can be seen that there is a need for an improved method for executing commands on multiple computers of a network.

SUMMARY OF THE INVENTION

In accordance with the foregoing, a method for executing commands on multiple computers of a network is provided. In accordance with the invention, a command may be entered at one computer, replicated, and sent to other computers of the network. Each computer receiving the replicated command may also repeat the replication process and send the command to still other computers. The command may be stored and replicated in conjunction with the replication of entries or records of a database. When one computer updates another computer as to the changes made to its individual copies of the database, it transmits a replication message to the other computer. When the other computer receives the replication message, it may store the command in a record of its copy of the database and, if appropriate, execute it. A record type field may be used to distinguish command records from other types of database records. An execution task may periodically search a computer's copy of the database for command records whose execution times are current and, if such records are found, execute the commands contained therein on the computer.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
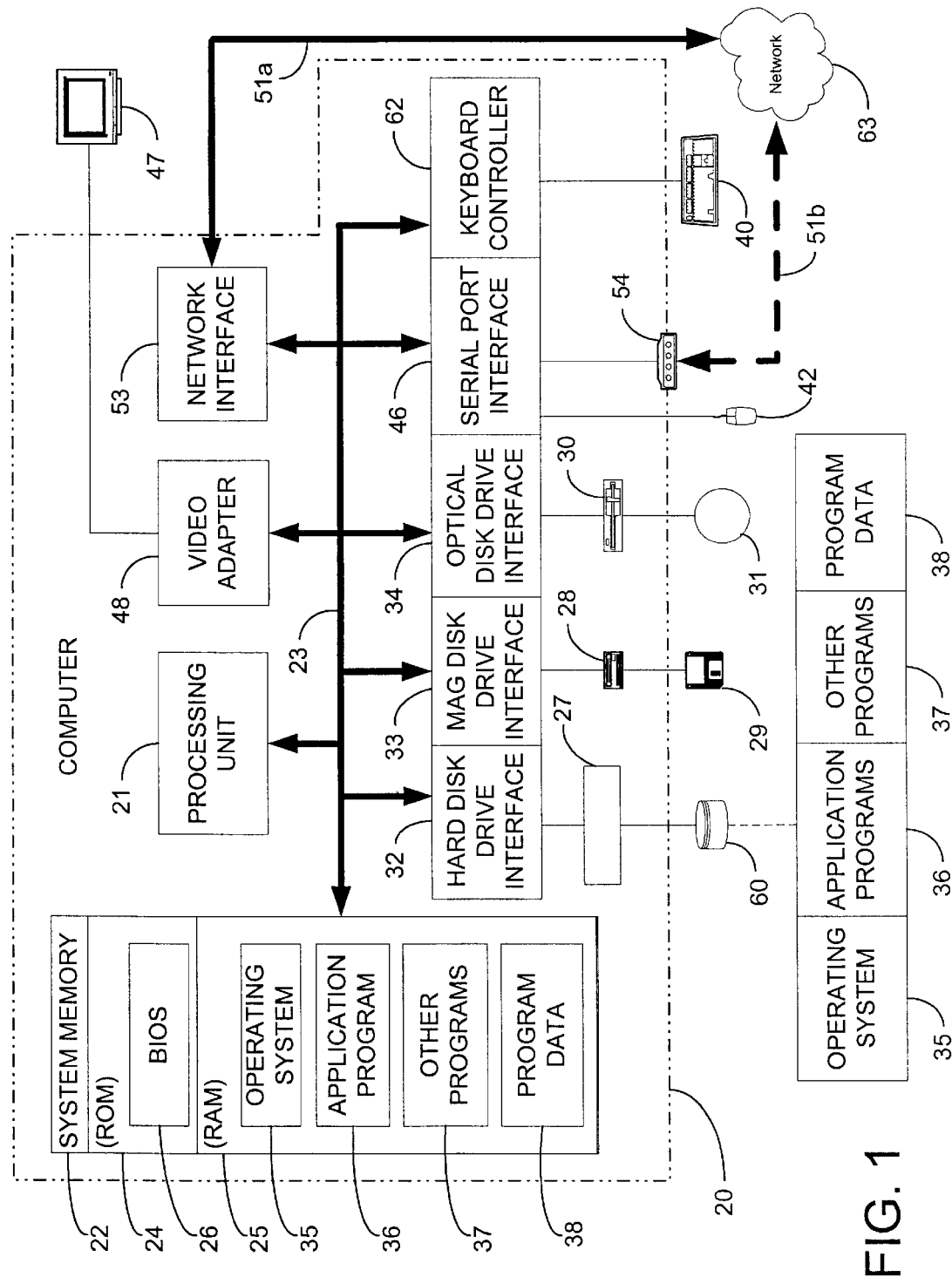
FIG. 1 is a block diagram generally illustrating an example computer environment in which the present invention may be practiced.

Turning to the drawings, wherein like reference numerals refer to like elements, an exemplary environment for implementing the invention is shown in FIG. 1. The environment includes a computer 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computer 20 may operate in a networked environment using logical connections to one or more devices within a network 63, including another computer, a server, a network PC, a peer device or other network node. These devices typically include many or all of the elements described above relative to the computer 20. The logical connections depicted in FIG. 1 include a land-based network link 51 a, for which there are many possible implementations, including a local area network (LAN) link and a wide area network (WAN) link 51b. Land-based network links are commonplace in offices, enterprise-wide computer networks, intranets and the Internet and include such physical implementations as coaxial cable, twisted copper pairs, fiber optics, wireless, and the like. Data may transmitted over the network links 51a–51b according to a variety of well-known transport standards, including Ethernet, SONET, DSL, T-1, and the like. When used in a LAN, the computer 20 is connected to the network 63 through a network interface card or adapter 53. When used in a WAN, the computer 20 typically includes a modem 54 or other means for establishing communications over the network link 51b, as shown by the dashed line. The modem 54, which may be internal or external, is connected to the system bus 23 via the serial port interface 46. In a networked environment, programs depicted relative to the computer 20, or portions thereof, may be stored on other devices within the network 63.

Those skilled in the art will appreciate that the meaning of the term "computer" is not limited to a personal computer, but includes other microprocessor or microcontroller-based systems, such as hand-held devices, multi-processor systems, microprocessor based or programmable consumer electronics, network PCs, minicomputers, mainframe computers, Internet appliances, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more programs executing on a computer system or being executed by parts of a CPU. A "program" is any instruction or set of instructions that can execute on a computer, including a process, procedure, function, executable code, dynamic-linked library (DLL), applet, native instruction, module, thread, or the like. A program may also include a commercial software application or product, which may itself include several programs. However, while the invention is being described in the context of software, it is not meant to be limiting as those of skill in the art will appreciate that various of the acts and operation described hereinafter may also be implemented in hardware.

Many modern computer networks maintain some form of replicated database, in which multiple copies of all or parts of the database are stored on multiple computers throughout the network. Each copy may be partial or complete. One example of such a replicated database is the zone file maintained by domain name service (DNS) servers. Each DNS server maintains a copy of a zone file, and changes to it are propagated from a primary DNS server to secondary DNS servers. Each zone file represents a partial copy of the entire domain database. Another example is the name database maintained by MICROSOFT WINDOWS INTERNET NAME SERVICE (WINS) servers. Each WINS server maintains a complete copy of the NETBIOS name database, and each WINS server may be configured for informing other WINS servers of any material changes made to the local copy of the database, and pushing those changes to the other WINS servers. Alternatively, each WINS server may be configured to check with other WINS servers about changes to their database and then pulling those changes from the other servers. The term "replication" as used herein refers to the transfer of database changes from one computer to another and includes both pull and push transfer as well as other replication techniques.

One common characteristic of many of these replicated-database networks is that when changes to the database are propagated throughout the computers of a network according to a replication protocol. In other words, when a computer makes a change to its copy of the database, sends a message containing a replica of the change, hereinafter referred to as a "replication message," to another computer in the network according to the replication protocol. That computer then sends yet another replication message to still another computer, and so on, until all of the copies of the database have been updated. These replication messages may be sent from computer to computer on a periodic basis as well as asynchronously. In such a network of computers, changes made to one computer's database will eventually replicate to all the other computers' databases if the computers are connected to each other directly or indirectly and configured for replication. This ensures that commands entered once on one computer get executed on the computers on which execution is required.

Figure 2:
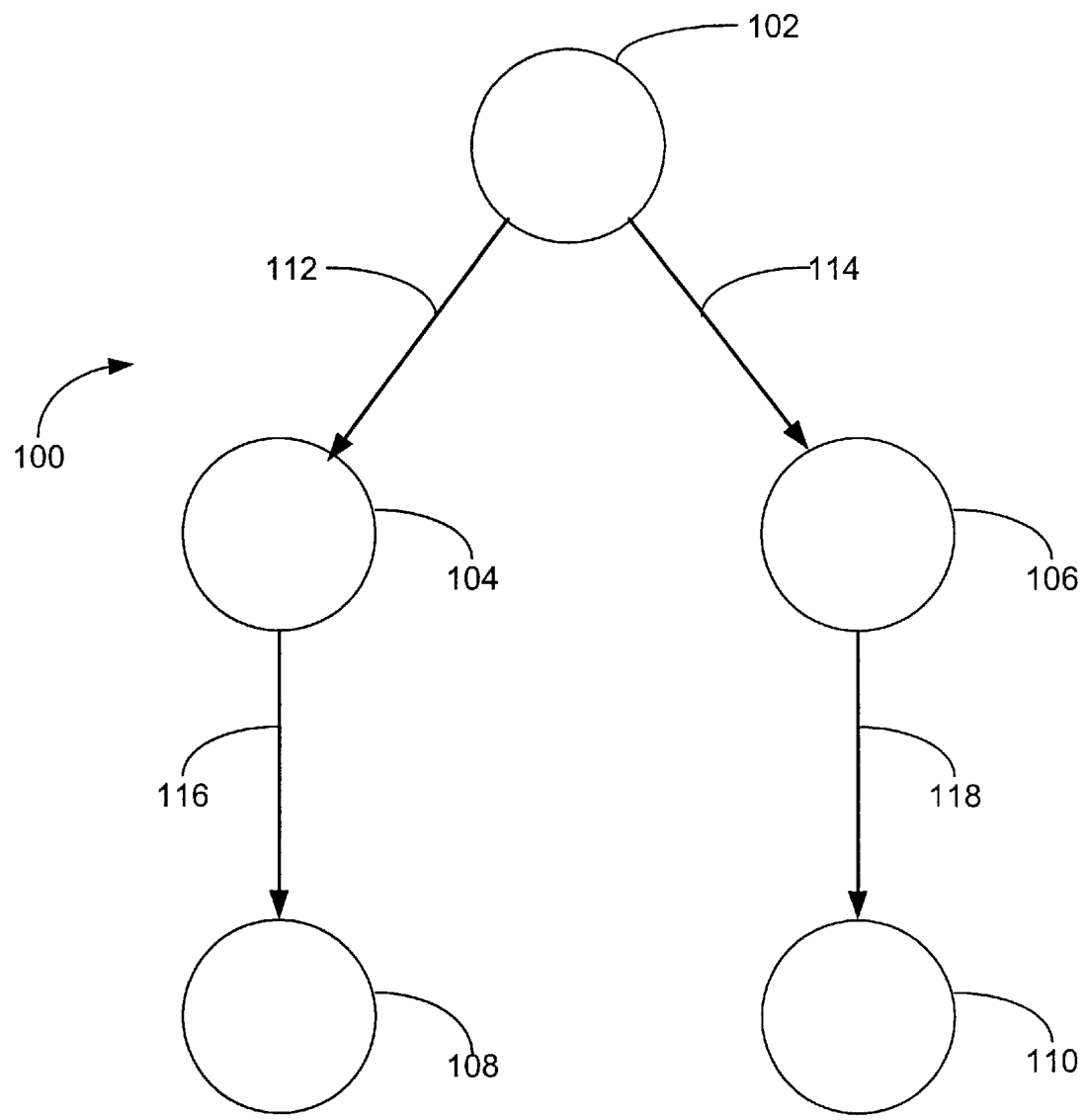
FIGS. 2–4 generally illustrate an example replication topology in which the invention may be practiced.
Figure 3:
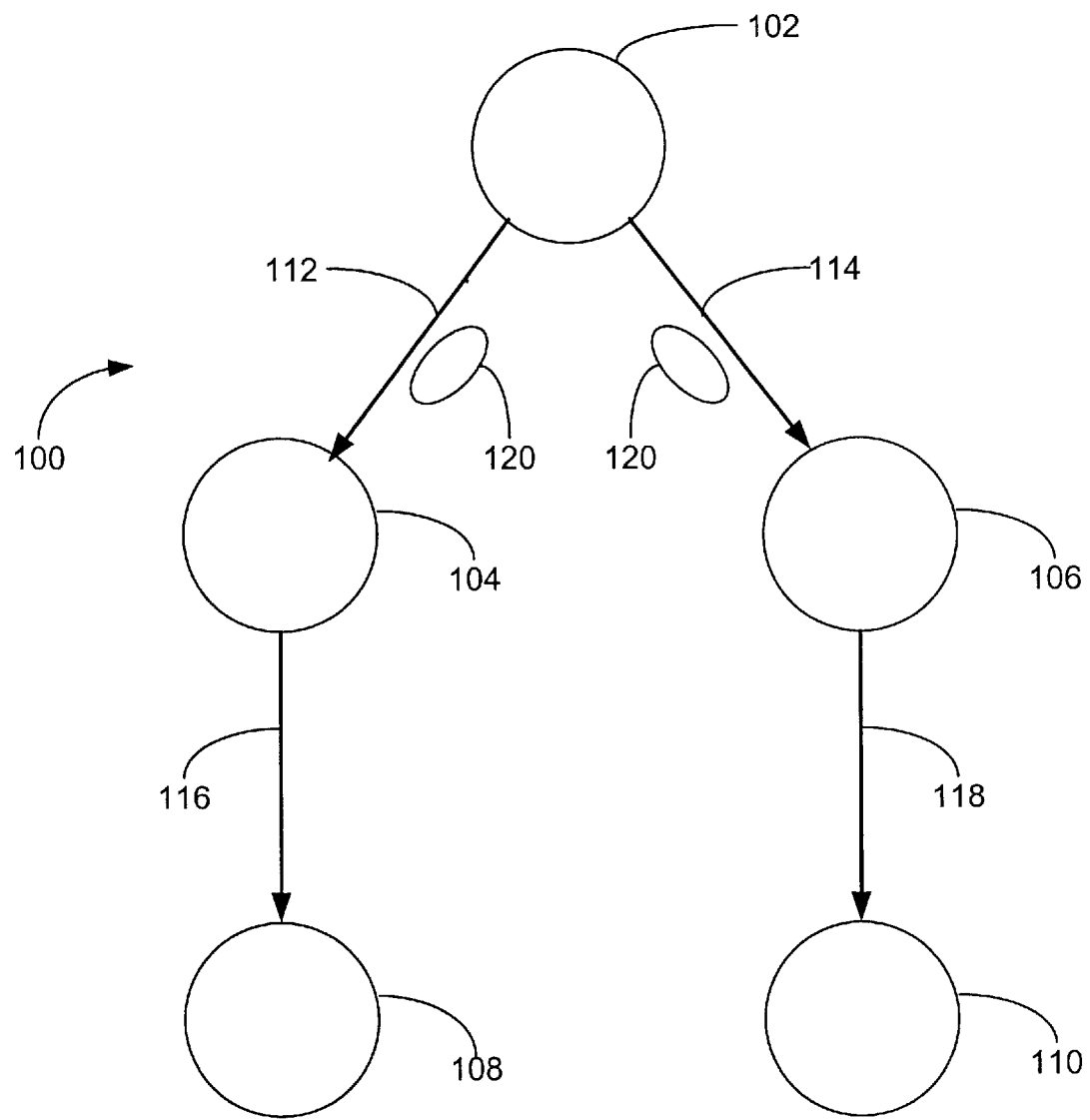
Figure 4:
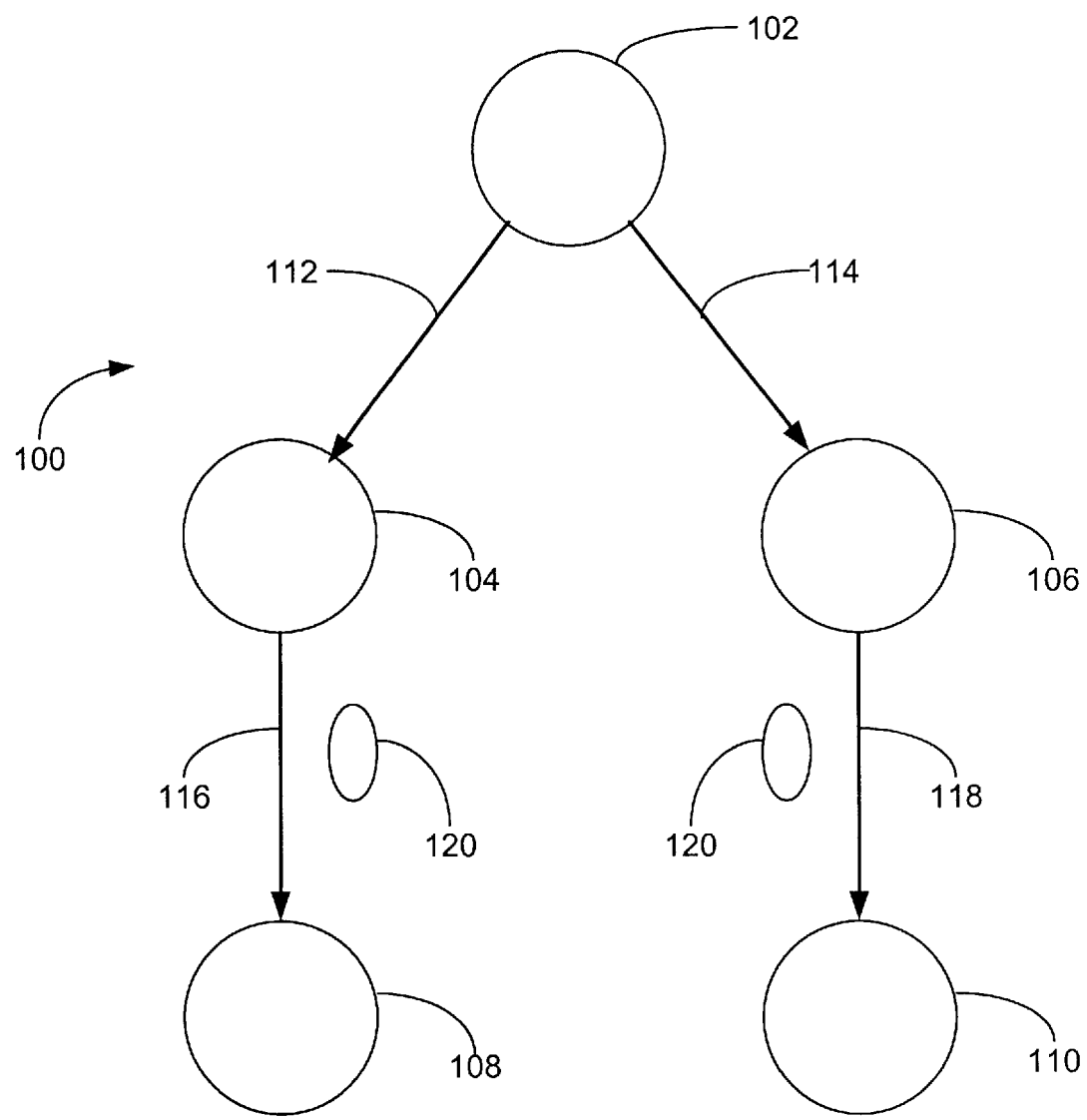

To illustrate by way of example, FIGS. 2–4 show a network 100 having computers 102, 104, 106, 108 and 110, in which changes to a replicated database are sent along update paths 112, 114, 116 and 118. If the computer 102 makes a change to its copy of the database, the computer 102 replicates the change and sends the replication messages, labeled 120 (FIG. 3), to the computers 104 and 106 along the replication paths 112 and 114 respectively. The computers 104 and 106 incorporate the change in their copies of the data set, replicate the changes, and send replication messages 120 (FIG. 4) to the computers 108 and 110 along the replication paths 116 and 118 respectively. The replication scheme shown in FIGS. 2–4 is generally hierarchical, and might be found in a DNS network.

Figure 5:
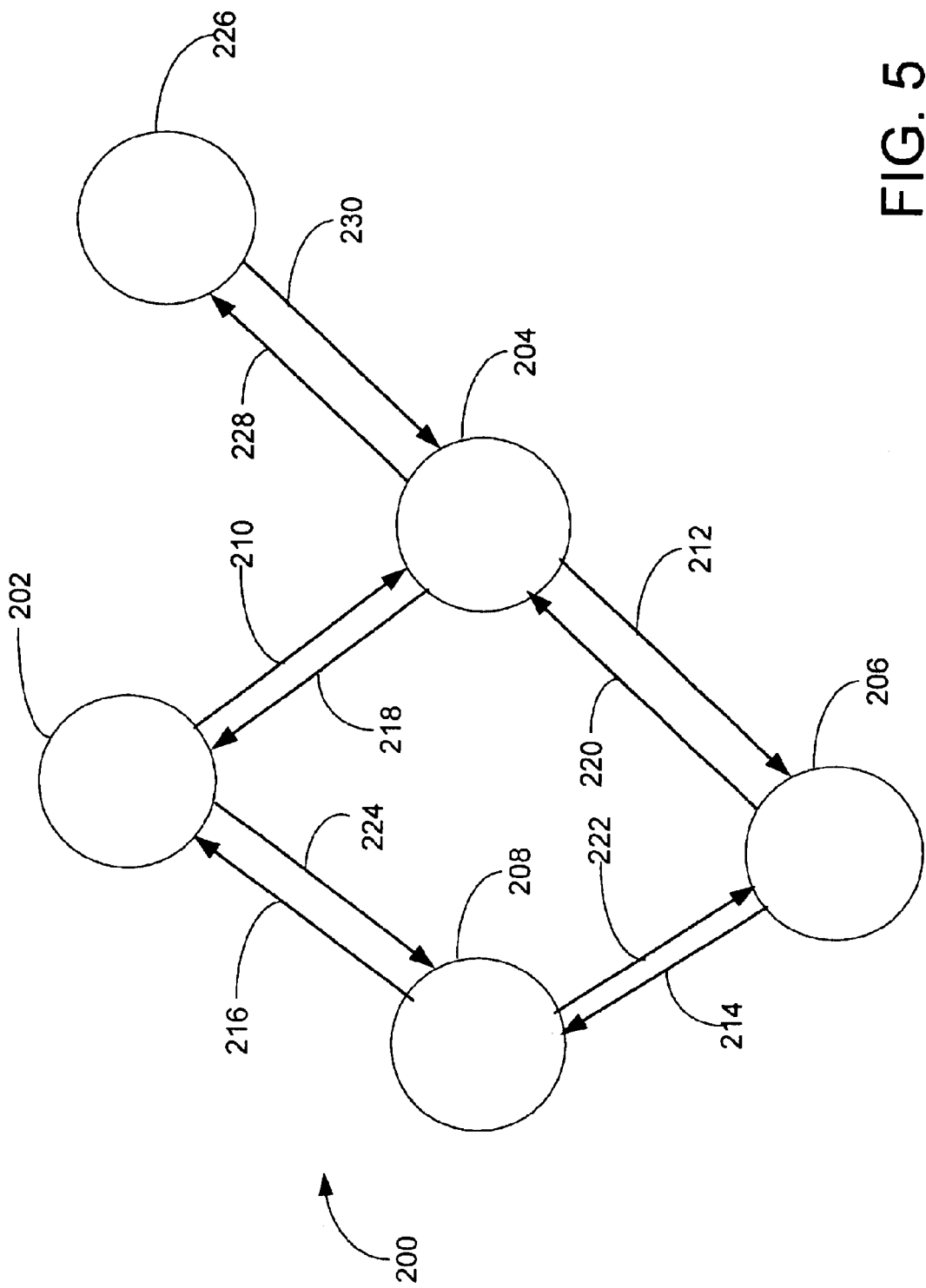
FIGS. 5–7 generally illustrate another example of a replication topology in which the invention may be practiced.
Figure 6:
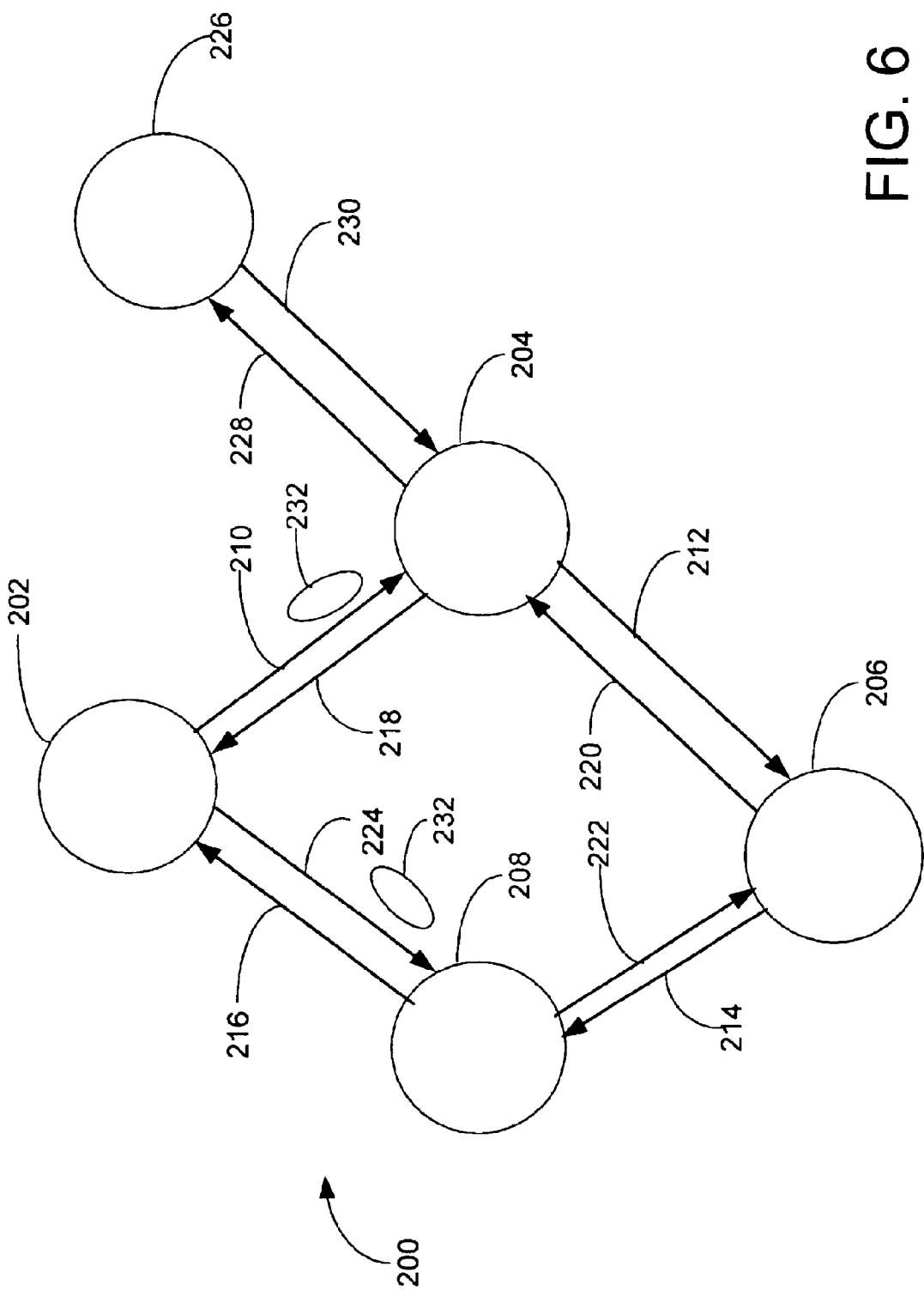
Figure 7:
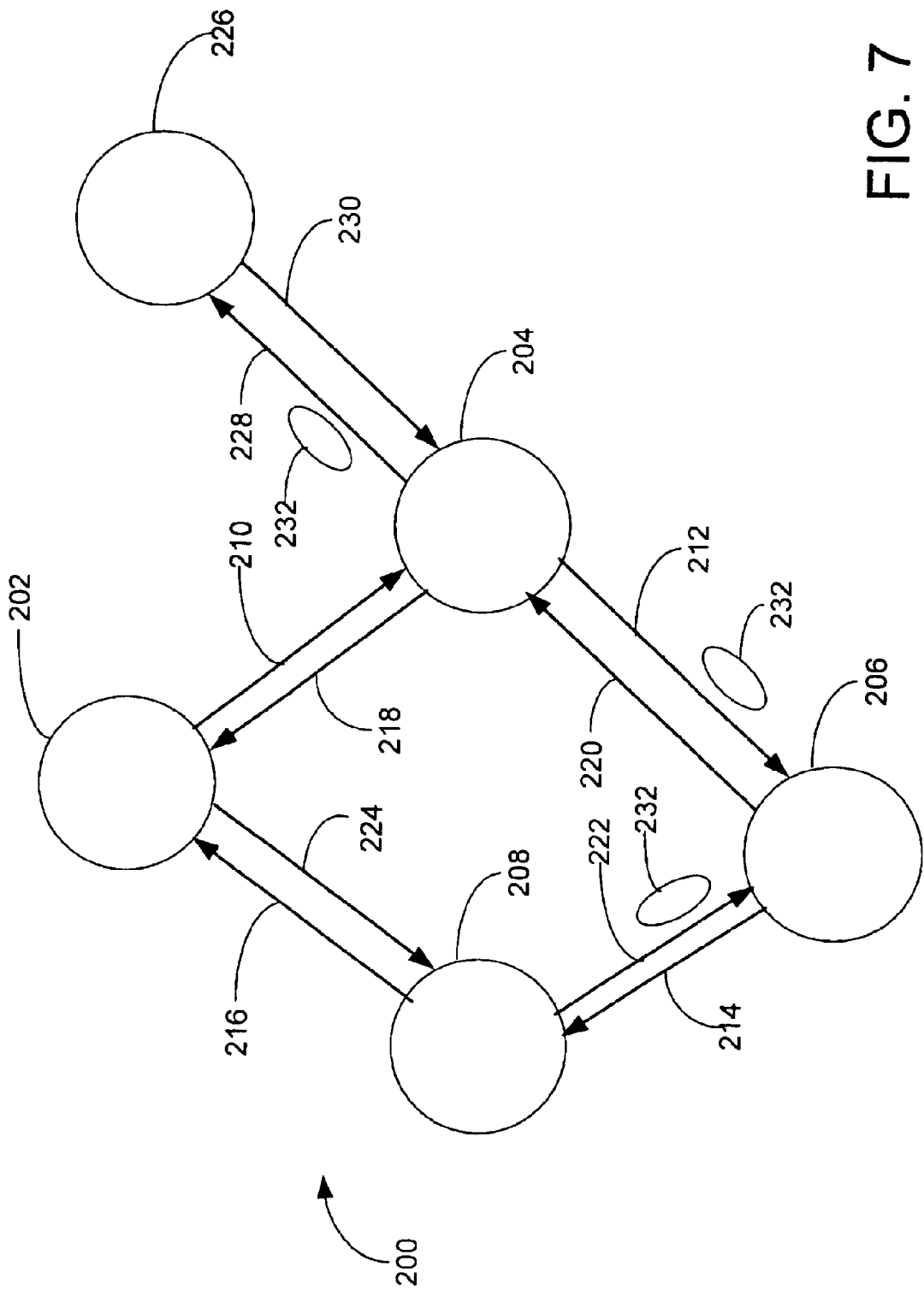

To illustrate another example, FIGS. 5–7 show a network 200 having computers 202, 204, 206, 208 and 226. A change in the data stored on one of the computers of the network 200 is replicated along one or more replication paths 210, 212, 214, 216, 218, 220, 222, 224, 228 and 230 until it is propagated throughout the entire network. For example, if the computer 202 changes its copy of the database, it replicates the change and sends corresponding replication messages, labeled 232 (FIG. 6), along the replication paths 224 and 210 to the computers 208 and 204 respectively. The computer 204 also replicates the change and sends a replication message 232 to the computer 226 over the replication path 228. A replication message 232 also reaches the computer 206 through either the replication path 222 or 212 depending on which of the computers 208 and 204 is able to provide the replication message first. The replication topology shown in FIGS. 5–7 represents a flat replication scheme in contrast to that of FIGS. 2–4. Network replication topologies other than the ones shown in FIGS. 2–7 are possible, including topologies that are partly hierarchical and partly flat.

The invention is generally directed to a method and system that uses a data replication scheme, such as one of the schemes described above, to propagate a command throughout a network of computers, and to cause each computer to execute the command. According to an embodiment of the invention, the command is entered at one computer in the network and stored as a record in a replicated database. The computer at which the command is entered replicates the command and sends the replicated command in a replication message to other computers in the network according to the replication scheme. This process is repeated throughout the network until all of the computers have a record containing the command in their copes of the database. Any type of command that can be executed on a computer may be included in a command record.

A command record may contain other information, such as when the command is to be executed, how often, and at what periodicity the command is to be executed. A command record may also specify the conditions under which the command is or is not to be executed. A command record may also specify which computers are to execute the command, allowing a user to specify a subset of the computers of the network as command executors. A task may periodically be run on each computer in the network to search for command records whose execution time is current and execute the command or commands contained therein. Another task may be periodically run on each computer in the network to search for and delete stale records. The invention may be advantageously practiced on networks for which a data replication mechanism already exists. Examples of these include networks of WINS servers, DNS servers and dynamic host configuration protocol (DHCP) servers.

Figure 8:
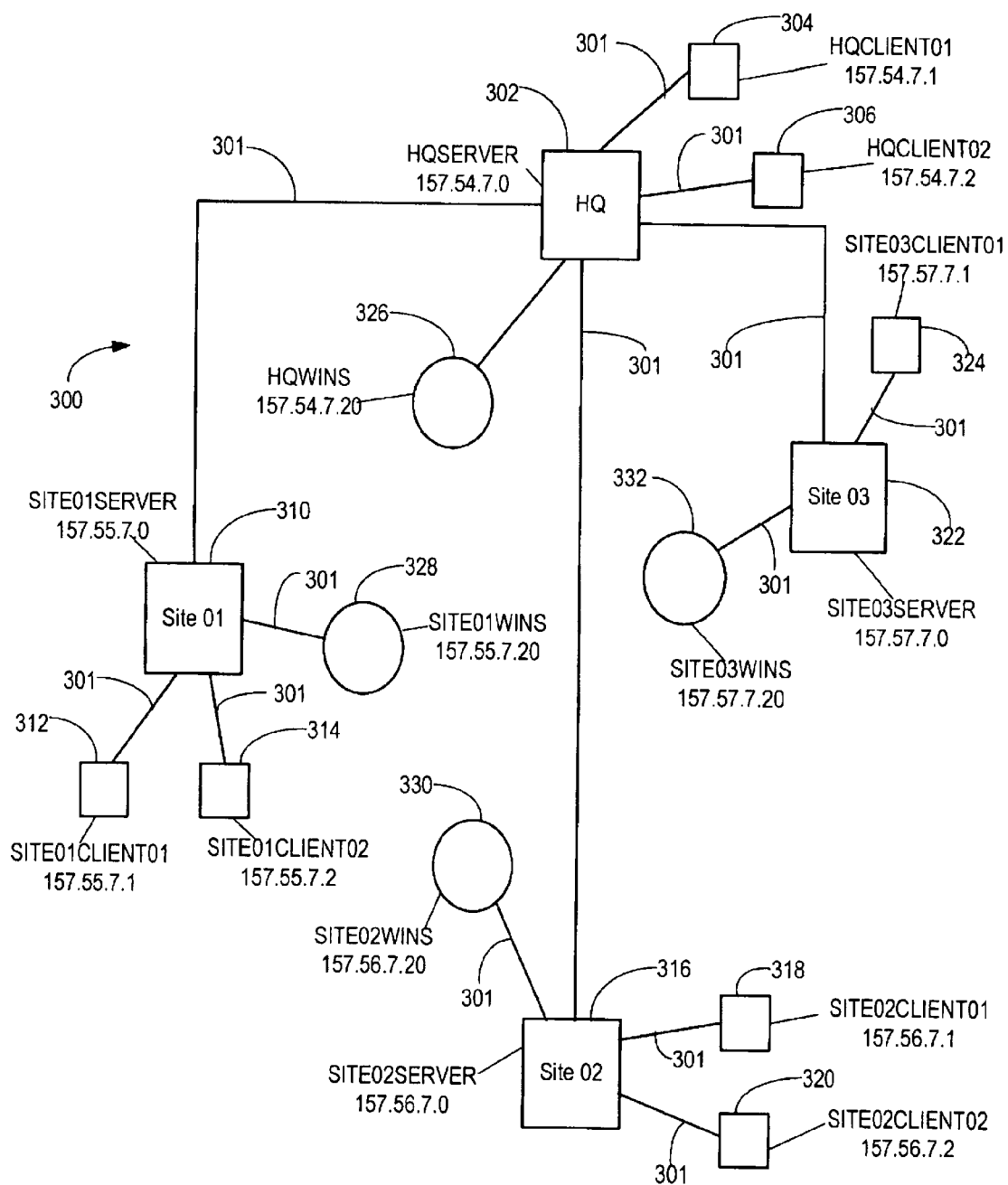
FIG. 8 generally illustrates an example of a WINS-enabled network in which the invention may be practiced.

Referring to FIG. 8, an example of how an embodiment of the invention may be implemented in a simple WINS-supported network will now be described. The network, generally labeled 300, includes a server 302 located at a corporate headquarters. The server 302 communicates with clients 304 and 306 over network links 301. The network 300 also includes a branch-office servers 310, 316 and 322, which are all communicatively linked to the server 302 by network links 301. The branch-office servers are further communicatively linked to their respective clients 312, 314, 318, 320 and 324 by respective network links 301. Each branch office server 310, 316 and 322 is also linked to a respective WINS server 328, 330 and 332 by respective network links 301. The headquarters server 302 is communicatively linked to a WINS server 326 by a network link 301. The names and Internet protocol (IP) addresses for the each server and client in the network 300 is shown in FIG. 8 as well. It is understood that there may be any number of WINS servers in the network, and that the number shown is only meant to be illustrative.

Figure 9:
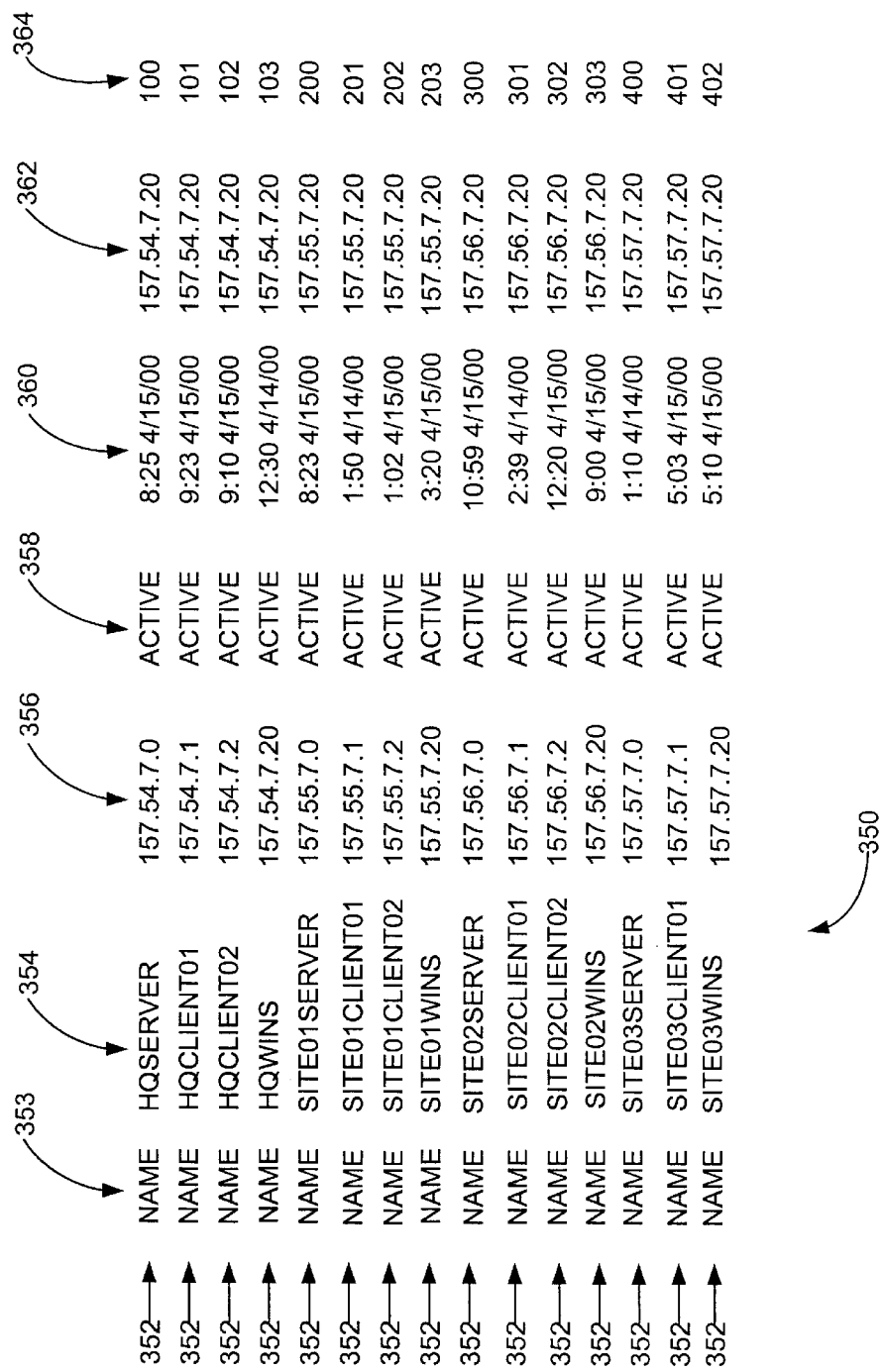
FIG. 9 generally illustrates an example of a WINS replicated database.

Each WINS server in the network 300 maintains a copy of a NETBIOS name database shown in FIG. 9. It is well known that having a WINS server at each geographical location in a corporate network helps to reduce the amount of time required for a computer on the network to receive a response to a WINS request, since the request can be handled locally, rather than, for example, having to be sent to the headquarters. The database, generally labeled 350, has a set of records, including a NETBIOS name record 352 for each computer in the network 300. Each record in the database 350 has six fields, labeled 353, 354, 356, 358, 360, 362 and 364. The field 353 identifies the type of the record. In this embodiment of the invention, the possible types are NAME—to indicate that the record contains a NETBIOS name, and COMMAND—to indicate that the record contains a command. Each name record 352 holds the name of a computer in the field 354; its IP address in the field 356; the state of the name record in the field 358; the time stamp of the name record in the field 360; the IP address of the owner of the record in the field 362; and the version number that uniquely identifies the record in the field 364.

Figure 10:
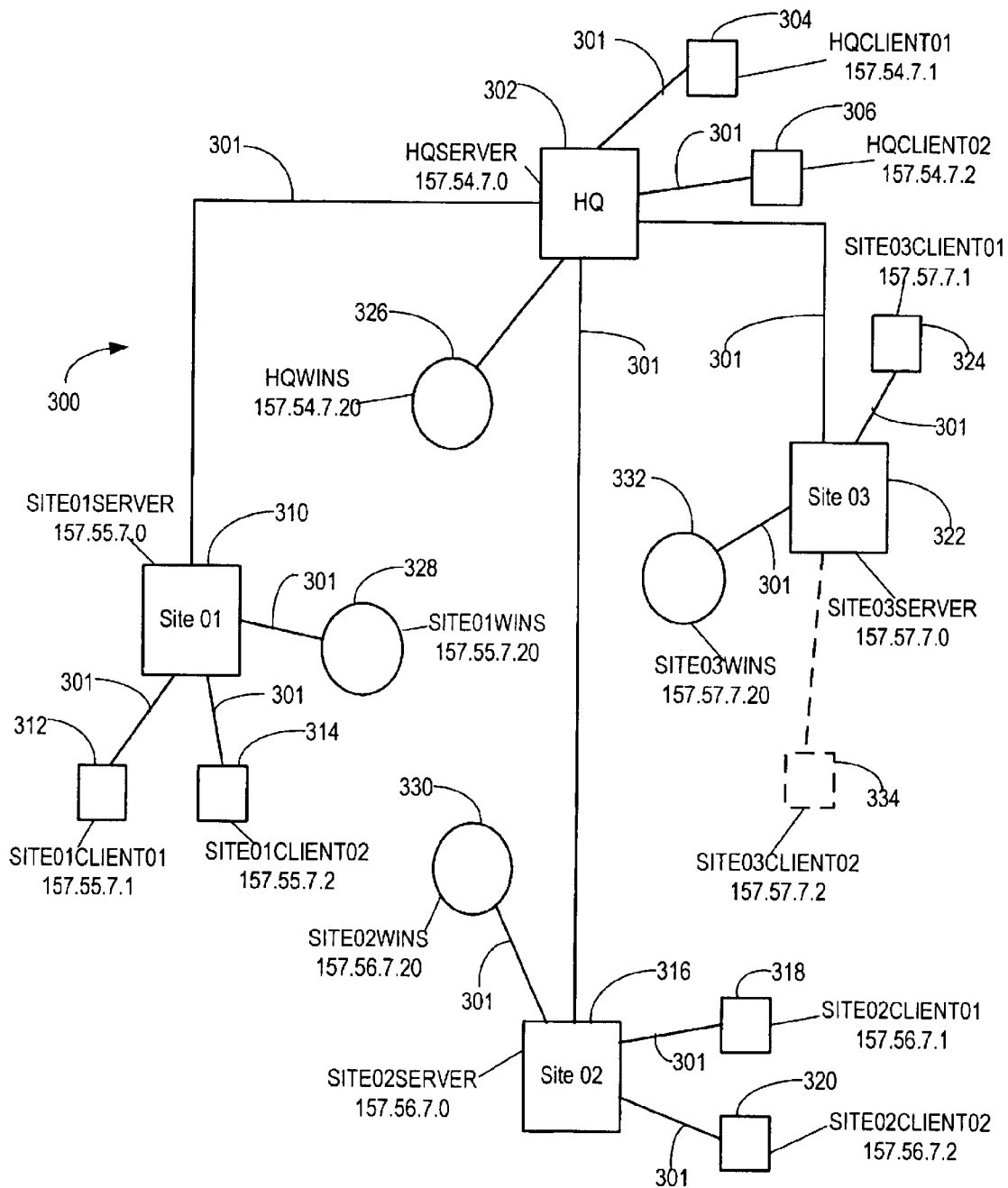
FIGS. 10–11 generally illustrate the addition of a new computer to the network of FIG. 8 and the consequent change to the replicated database of FIG. 9.
Figure 11:
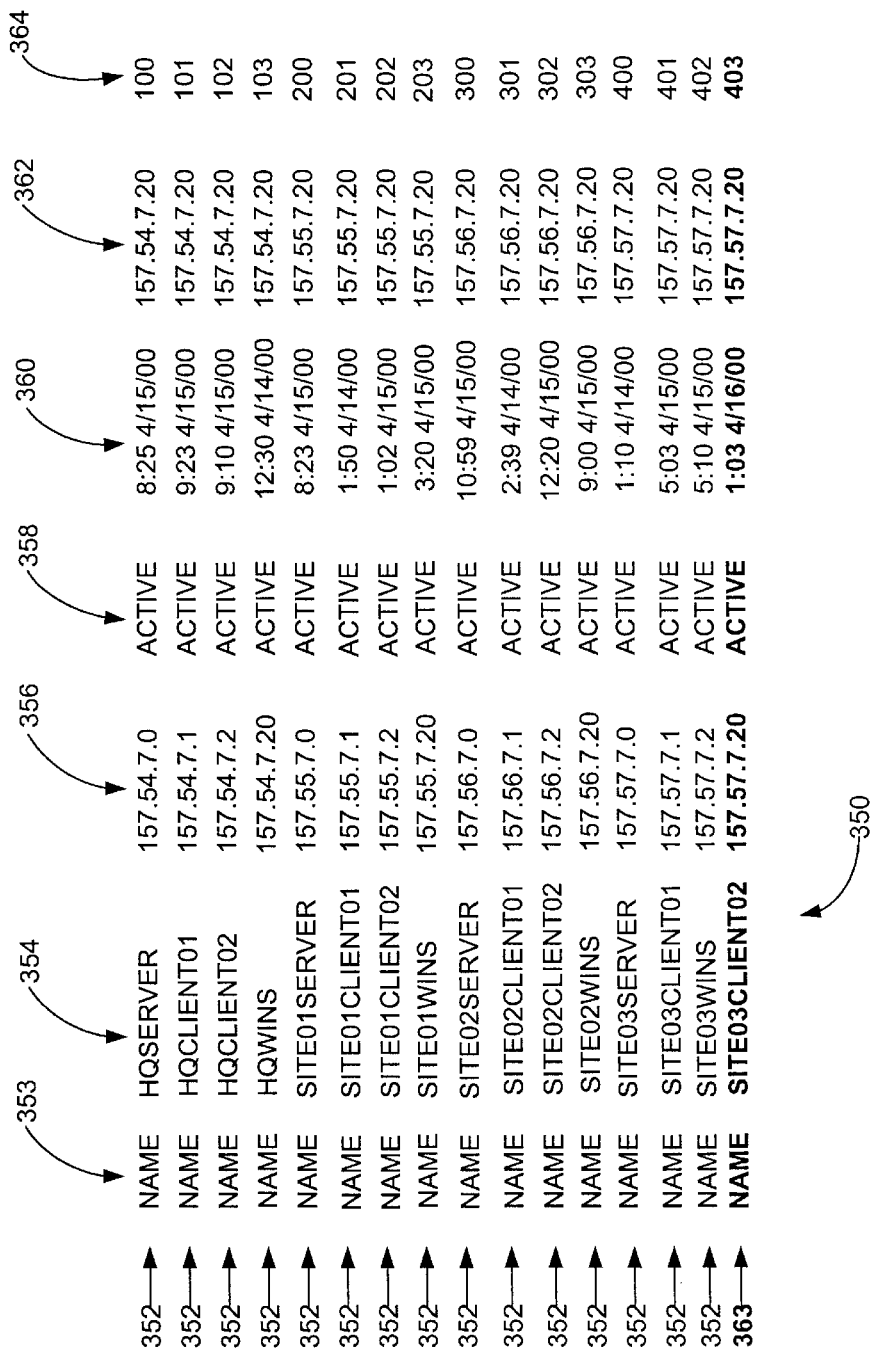

As is conventional, WINS servers create NETBIOS name entries in response to requests from clients on the network. A WINS server that is the first to create a record is known as the "owner" of that record, and its IP address is stored in column 362 of the record. Referring to FIG. 10, if a new client computer 334 is added to the server 322, for example, the new computer 334 may request that it be assigned a WINS name. The request is passed to the closest WINS server, which is the WINS server 332. In response to the request, the WINS server 332 assigns a name to the new computer, as shown in FIG. 11, and creates a new record 363, in its copy of the database. Since the highest version number for the entries owned by the server 332 (IP address 157.57.7.20) was previously 402, the new record is assigned a version number of 403. The owner IP address is the address of the WINS server 332, which is 157.57.7.20.

Figure 12:
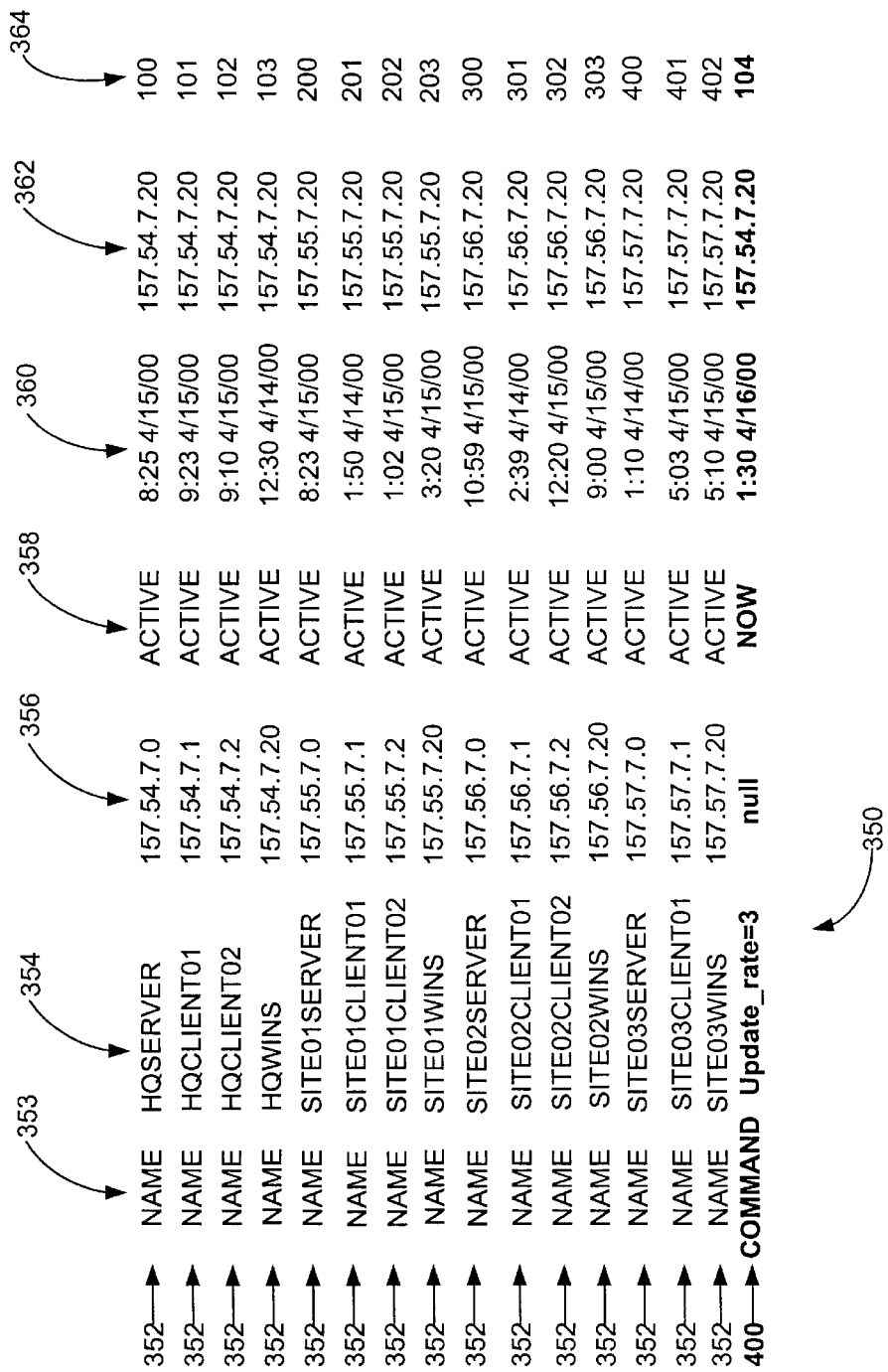
FIG. 12 generally illustrates an example of a command record that has been inserted into the example database of FIG. 9.

According to an embodiment of the invention, a command or set of commands to be executed by the WINS servers of the network 300 may be stored in a command record along with the NETBIOS name records of a copy of the replicated database. Referring to FIG. 12, an example of such a command record that has been inserted into the example database 350 is shown. The command record, labeled 400, holds a command in the field 354, and an execution parameter in the field 358. The fields 353, 360, 362 and 364 are used to hold the type identifier, timestamp, owner address and version number, as is the case for NETBIOS name records, while the field 356 is unused. Of course, many other formats are possible for a command record as well.

An execution parameter of a command record indicates when the command should be executed. The command record 400 of FIG. 12 has an execution parameter of Now, which indicates that the command should be executed immediately. Other possible types execution parameters include: Delayed by (time)—to indicate that the execution of the command should be delayed by the amount "time"; and Periodic (unit of time)—to indicate that the command should be executed once every unit of time specified.

Figure 13:
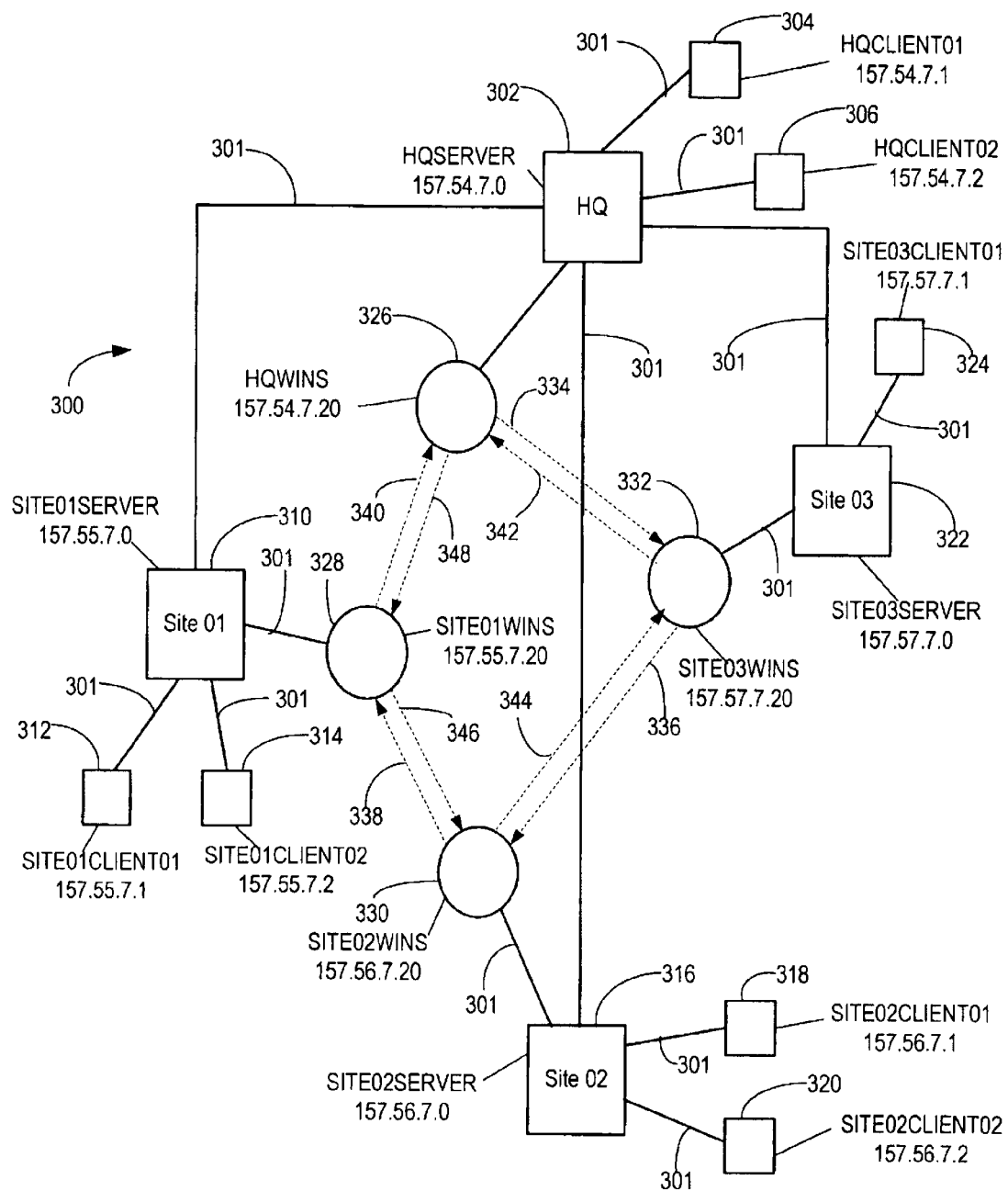
FIG. 13 generally illustrates an example of a replication topology for the network of FIG. 8.

Referring to FIG. 13, the replication topology used by the WINS servers of the network 300 to update one another as to changes made to their copies of the replicated database is shown. Servers that are adjacent to one another in the replication topology will be referred to herein as "direct partners." For example, the servers 326 and 328 are direct partners. As part of the replication protocol, the WINS servers determine which entries need to be replicated and sent as replication messages to one another by comparing version numbers. For example, if the WINS server 326 requests an update from the WINS server 328, the server 328 sends the server 326 a list of the version numbers of the records in its copy of the database. The server 326 then determines whether it or not it already has the records corresponding to the received version numbers in its database. If the server 326 finds that it is missing an record, then the server 326 requests a replica of the data in the missing record from the server 328. The server 328 replicates the data and sends the replicated data as part of a replication message to the server 326. If multiple entries are missing, then the server 328 may send the appropriate data copies as part of a single replication message or in several replication messages. It is contemplated that the replication messages may be sent from server to server using a secure communication standard such as internet protocol security (IPSEC).

A WINS server in the network 300 sends replication messages to other WINS servers in response to update requests received from the other computers. However, a WINS server may also send replication messages periodically to other WINS server. In an embodiment of the invention, when a WINS server of the network 300 receives a replication messages containing a command that requires immediate execution, the WINS server immediately executes the command, and replicates it to its direct partners. This helps ensure that the command is executed as soon as possible throughout the network.

Figure 14:
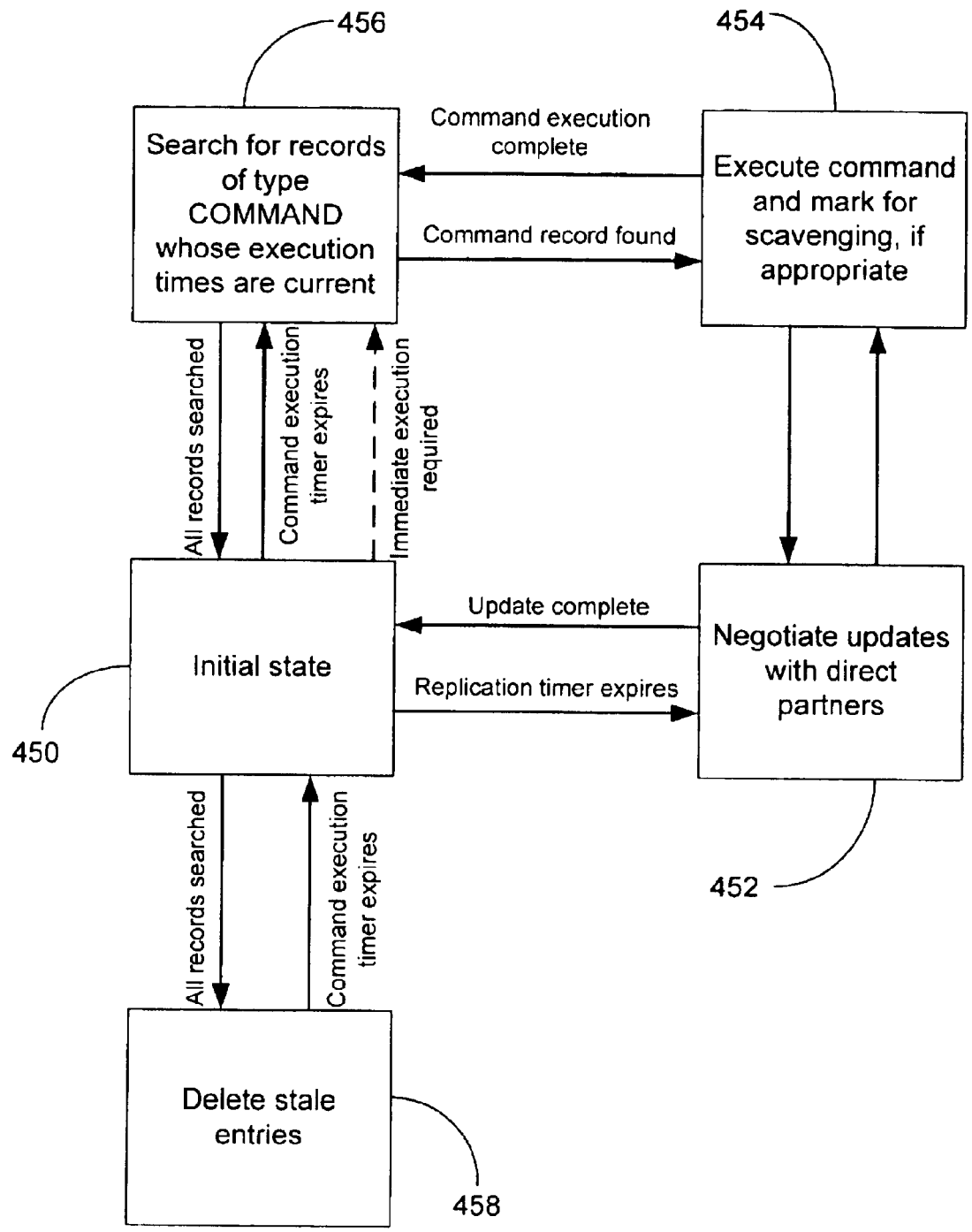
FIG. 14 is a state machine generally illustrating an example of how various tasks may be executed on each WINS server of FIGS. 8 and 13 in accordance with an embodiment of the invention.

In an embodiment of the invention, a command execution task periodically executes on each WINS server of the network 300 to determine whether there are any command records having commands whose execution time is current. A scavenger task may also be periodically executed to delete any stale records. Finally, a replication task may periodically be executed on each WINS server to cause it to request updates from its direct partners. Referring to the state diagram of FIG. 14, an example of how these tasks may be executed is shown. At the initial state 450, a replication timer, a scavenger timer and a command execution timer are independently running on one of the WINS servers of the network 300. When the replication timer expires, the state changes to the state 452, in which the WINS server requests direct updates from its direct partners using the replication protocol described above. Once all required updates (if any) have been received, then the replication timer is reset and the state changes back to the state 450.

When the command execution timer expires, or if a command requiring immediate execution is received in a replication message, the state changes from the state 450 to the state 456. At the state 456, the command execution task searches the database for records of the type "command." If it finds a command record, it determines whether the execution time is current. It may also check if there are any conditions precedent to executing the command listed in the record. If the execution time is current, and all other conditions precedent have been met, then the state changes to the state 454, at which the command is executed, and, if the command is a "run once" type of command (as opposed to one that has to be periodically executed), then the command record is marked for deletion by the scavenger task. The state then returns to the state 456, at which the command execution task continues to search the database. Once the search of the database is complete, the state returns to the start state 450.

When the scavenger timer expires, the state changes to the state 458, at which the scavenger task is executed. The scavenger task searches the database, and deletes records that are stale. Once the scavenger task has deleted all stale records, then the state changes back to the start state 450. Although the state diagram of FIG. 13 depicts the command execution task, the replication task and the scavenger task as executing one at a time, it is understood that these tasks may all be executed simultaneously, such as on a multi-threaded computer. For example, the command execution (state 454) and the command search (state 456) may be performed in parallel by separate threads. Furthermore, commands may be batched together for concurrent execution.

There are many types of commands that may be stored in a command record. Examples include commands to: configure or reconfigure the server with certain parameters; shutdown, pause, or resume the server; shutdown or start an activity of the server; quit or start servicing client updates; ignore or honor all replication messages from a certain server; delete the entire set of records having a certain owner (because the owner no longer exists, for example); update a set of records at a specified time; periodically scavenge records of a certain type; periodically send statistics to a central server; backup data on the server; start using a certain quality of service for replication messages; and commands to start filtering certain database updates, queries, or replication traffic.

Figure 15:
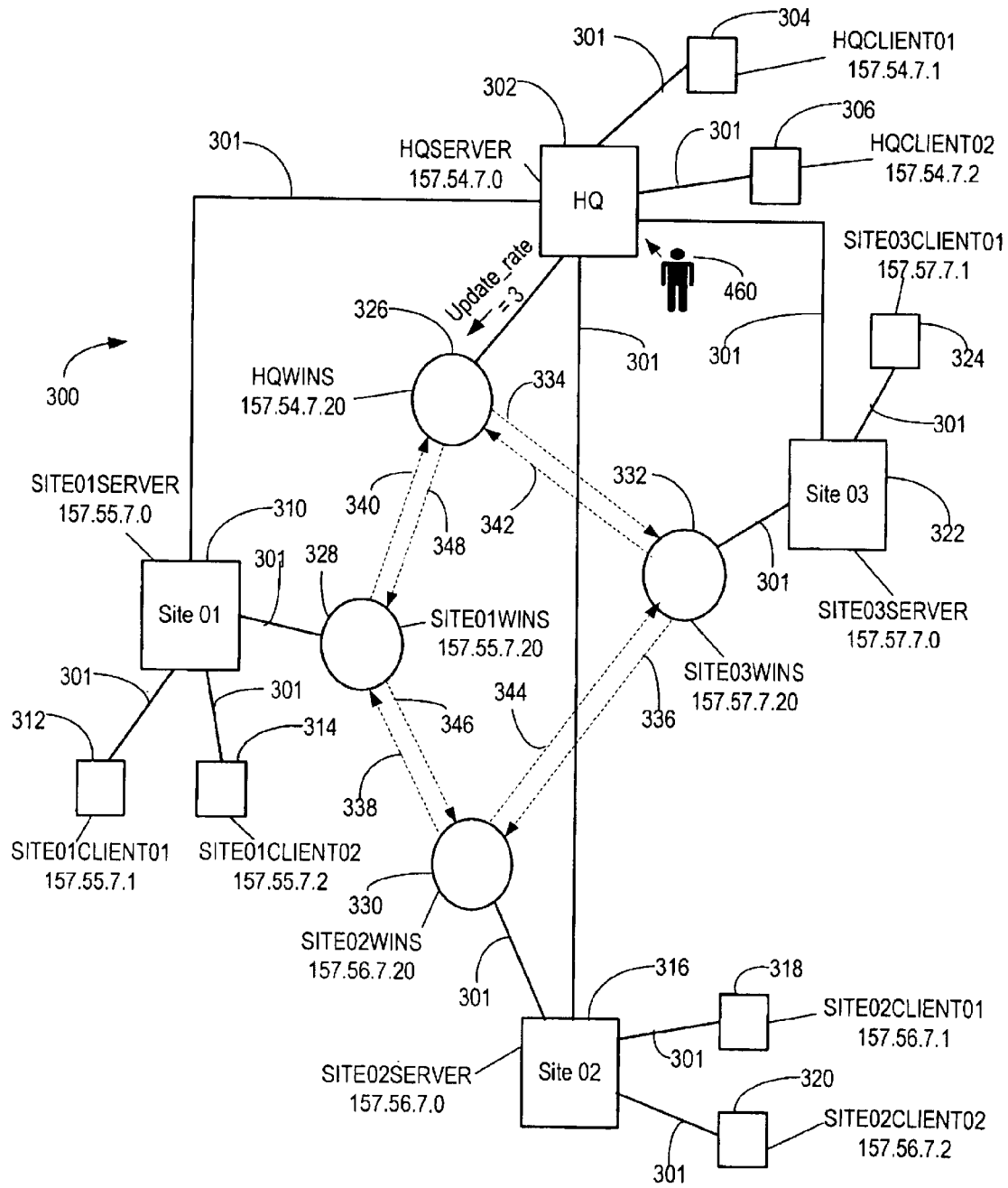
FIGS. 15–17 generally illustrate how a network administrator may enter a command at one of the WINS servers of the example network of FIGS. 8 and 13, and how the command may be replicated throughout the network.

In accordance with an embodiment of the invention, commands are propagated across the network 300 as entries in the WINS database. An example of how this may occur will now be described. This example makes use of the network 300 that was introduced in FIG. 8 and the example database of FIG. 12. It is assumed that the WINS servers 326, 328, 330 and 332 ordinarily request database updates from one another twice a day, and that this update rate is the default rate. Referring to FIG. 15, a network administrator 460 located at the headquarters enters a command to override the default rate and to change it to three times a day. This command is recorded in the database of the WINS server 326 as the record 400 of FIG. 12.

Figure 16:
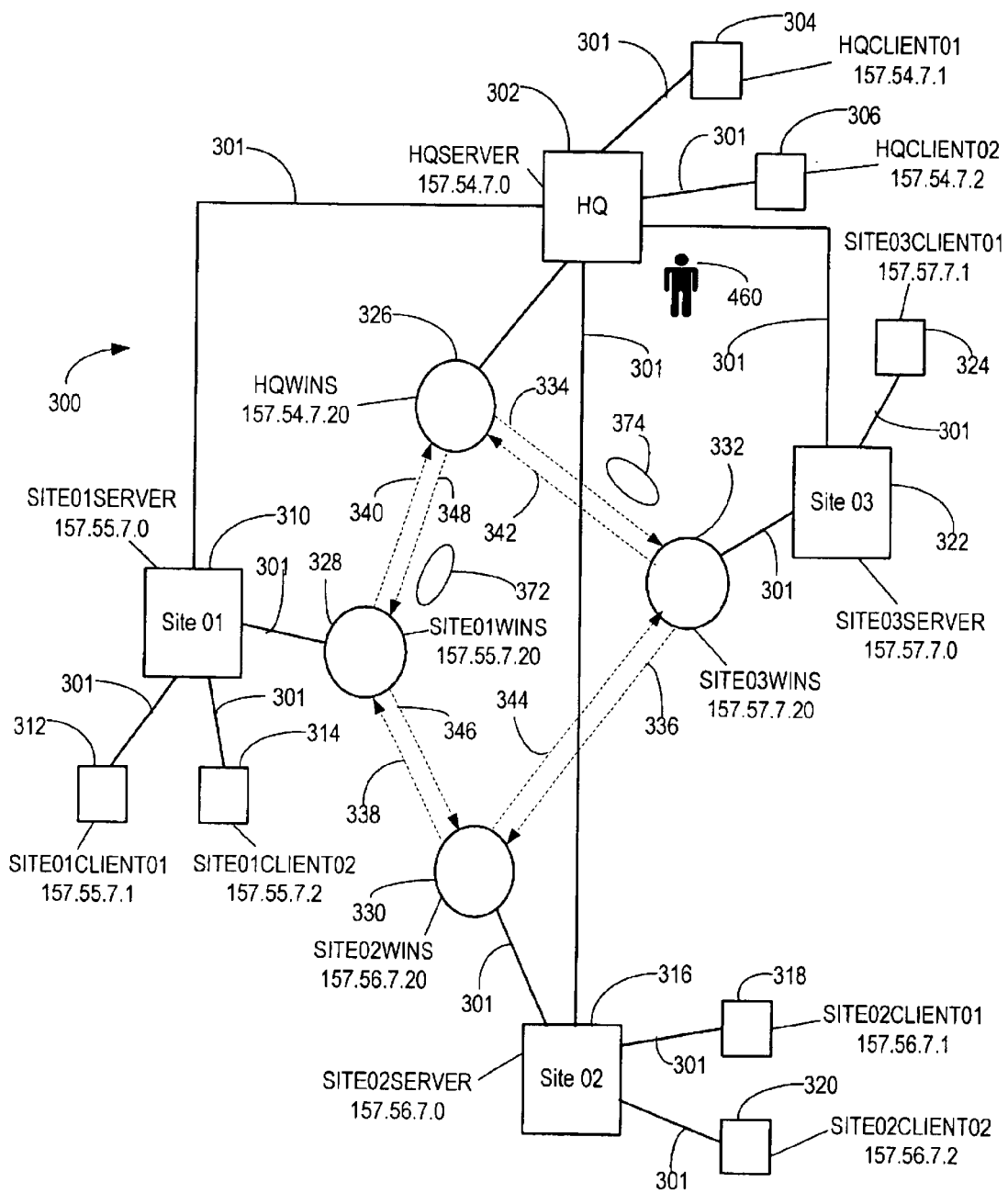
Figure 17:
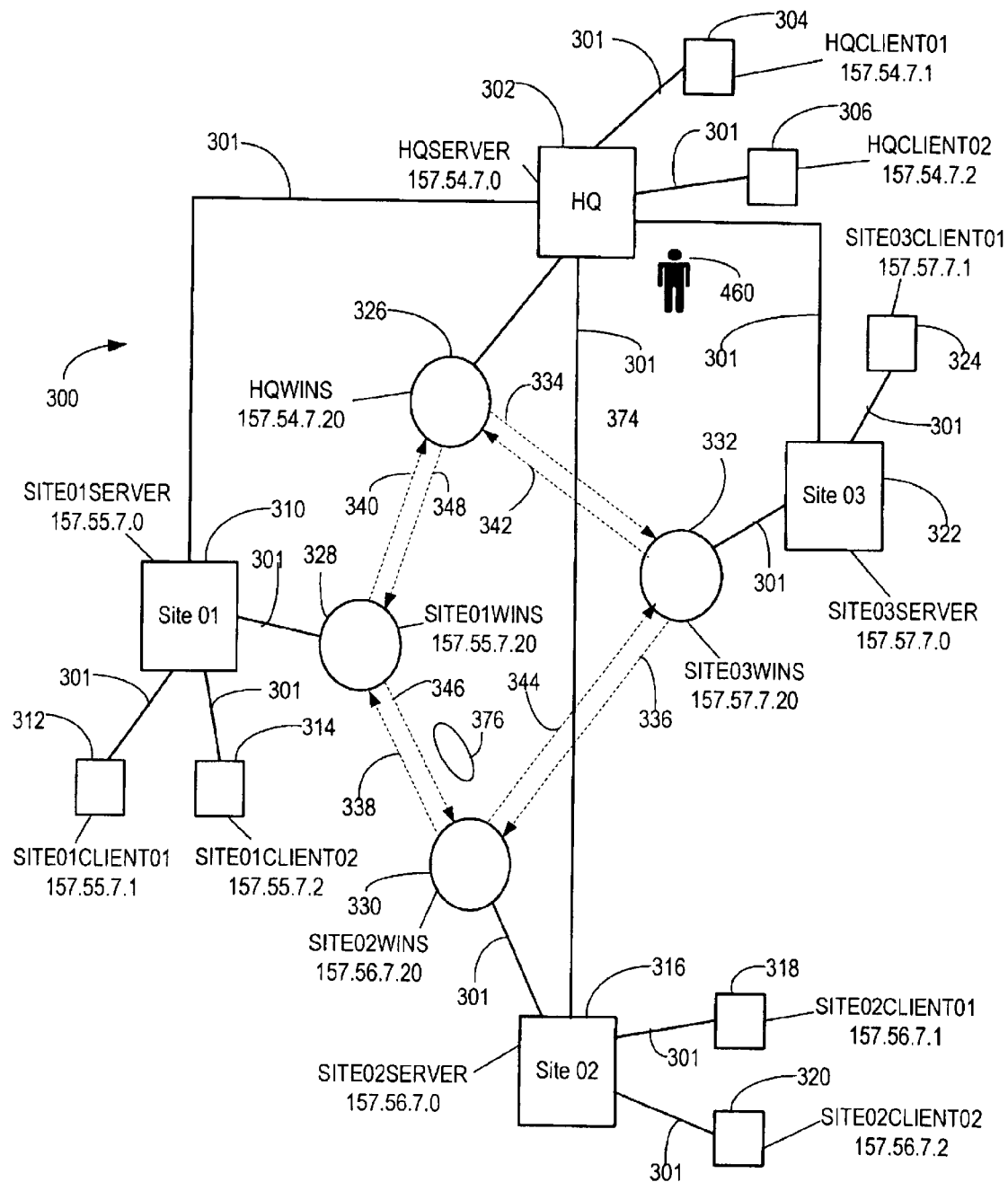

Referring to FIG. 16, the WINS server 326 recognizes that the command requires immediate execution. The WINS server 326 thus immediately executes the command, immediately replicates it in a replication message 372 to the WINS server 328 along the path 348, and to the WINS server 332 along the path 332. Each WINS server 332 and 328 stores the command in a command record as part of its copy of the database and, recognizing that the command requires immediate execution, invokes a command execution task, thereby resetting the update rate. Assuming that the WINS server 328 is able to do so before the WINS server 332, the WINS server 328 immediately replicates the command and sends a third copy of the command in a replication message 376 (FIG. 17) along the path 336 to the WINS server 330. The WINS server 330 then stores the command in a command record as part of its copy of the database and invokes the execution task.

It can thus be seen that a new and useful method and system for executing commands on multiple computers of a network has been described. In view of the many possible embodiments to which the principals of this invention may be applied, it should be recognized that the embodiments described herein with respect to the drawing figures is meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

I claim:

1. A computer-readable medium having stored thereon computer executable instructions for performing steps comprising:
   at a computer of a network, receiving a at least one replication message from another computer of the network, the at least one replication message comprising a command record, the command record comprising:
      a command to be executed on the computer; and
      a command execution schedule and
   executing the command of the command record on the computer in accordance with the command execution schedule of the command record;
   wherein the command of the command record defines at least one operational instruction to be performed on the computer.

2. The computer readable medium of claim 1, wherein the replication message is received from a direct replication partner of the computer.

3. The computer readable medium of claim 1, wherein the command execution schedule of the command record comprises an execution time parameter to indicate to the computer when the command of the command record is to be executed.

4. The computer readable medium of claim 1, wherein the command execution schedule of the command record comprises an execution parameter to indicate to the computer how many times the command of the command record is to be executed.

5. The computer readable medium of claim 1, wherein the command execution schedule of the command record comprises an execution frequency parameter to indicate to the computer the frequency at which the command of the command record is to be executed.

6. The computer readable medium of claim 1, wherein the command record further comprises a condition parameter to indicate to the computer the conditions under which the command of the command record is to be executed.

7. The computer readable medium of claim 1, wherein the command of the command record is a command to cause the computer to change the rate at which it sends or receives replication messages to or from other computers in the network.

8. The computer readable medium of claim 1, wherein the command of the command record is a command to backup data on the computer.

9. The computer readable medium of claim 1, wherein the command of the command record is a command to configure the computer.

10. The computer readable medium of claim 1, wherein the command of the command record is a command to use a quality of service for replication messages.

11. The computer readable medium of claim 1, wherein the command of the command record is a command to filter one or more database updates.

12. The computer readable medium of claim 1, wherein the command of the command record is a command to filter one or more database queries.

13. The computer readable medium of claim 1, wherein the command of the command record is a command to filter one or more replication messages.

14. The computer readable medium of claim 1, wherein the network is a network of WINS servers.

15. The computer readable medium of claim 1, wherein the network is a network of DNS servers.

16. The computer readable medium of claim 1, wherein the network is a network of DHCP servers.

17. The computer readable medium of claim 1, having stored thereon further computer executable instructions for: replicating the command record to another computer of the network for execution thereon.

18. The computer readable medium of claim 1, having stored thereon further computer executable instructions for performing steps comprising: determining whether the command of the command record requires immediate execution; and, if the command of the command record requires immediate execution, immediately executing the command of the command record.

19. The computer readable medium of claim 1, having stored thereon fiber computer executable instructions for performing steps comprising: determining whether the command of the command record requires immediate execution; and, if the command of the command record requires immediate execution, replicating the command record to another computer of the network for execution thereon.

20. The computer readable medium of claim 1, having stored thereon further computer executable instructions for performing steps comprising: receiving the replication message over a replication path defined in the network.

21. The computer readable medium of claim 16, having stored thereon further computer executable instructions for performing steps comprising: distinguishing the command record from other types of data receivable through the replication path.

22. The computer readable medium of claim 1, having stored thereon further computer executable instructions for performing steps comprising: storing the command record in a record of a database, wherein copies of the database are stored on multiple computers of the network.

23. The computer readable medium of claim 22, wherein the computer executable instructions for performing executing step further comprises instructions for: searching the database for records that contain command records whose execution times are current; and, if such command records are found, executing the commands of those command records.

24. The computer readable medium of claim 22, having stored thereon further computer executable instructions comprising: determining which command records are no longer needed; and deleting those command records.

25. The computer readable medium of claim 22, wherein the command of the command record is a command to cause the computer to delete one or more records of the database.

26. A computer-readable medium having stored thereon computer executable instructions for performing, on a computer of a network, steps comprising:
   receiving a command record from a first computer through a first replication path of the network, the command record comprising:

a command; and a command execution schedule; and replicating the command record to a second computer through a second replication path of the network;

wherein the command of the command record defines at least one operational instruction to be performed on each computer.

27. The computer readable medium of claim 26, having stored thereon further computer executable instructions for performing steps comprising: storing the command record in a record of a database, wherein copies of the database are stored on multiple computers on the network.

28. The computer readable medium of claim 26, having stored thereon further computer executable instructions for performing steps comprising: negotiating with the first and second computers to update the database.

29. The computer readable medium of claim 26, wherein the command record is received from a first direct partner of the computer and replicated to a second direct partner of the computer.

30. A method for executing a command on a plurality of computers of a network, the method comprising:

(a) entering the command at a first computer of the plurality;

(b) sending a replication message comprising a command record from the first computer to at least one other computer of the network, the command record comprising:

the command; and a command execution schedule;

(c) at the other computer, sending a second replication message comprising the command record to still another computer of the plurality; and (d) repeating steps (b) and (c) until the command record has been replicated throughout the network;

wherein the command defines at least one operational instruction to be performed on each of the plurality of computers.

31. The method of claim 30, wherein the sending and receiving steps are performed according to a replication protocol.

32. The method of claim 30, wherein the replication messages are sent to direct partners of the sending computers.

33. On a network comprising a plurality of computers communicating according to a replication topology, in which each computer of the plurality maintains a copy of a replicated database, a method for executing a command on each computer of the plurality, the method comprising:

at a computer of the plurality, receiving a command to be executed;

executing the command on the computer;

creating a replication message comprising a command record, the command record comprising:

the command; and a command execution schedule; and sending the replication message to at least one other computer of the plurality; and at each computer receiving the replication message, executing the command of the command record of the replication message in accordance with the command execution schedule of the command record of the replication message;

wherein the command of the command record defines at least one operational instruction to be performed on each of the plurality of computers.

34. The method of claim 33, further comprising storing the command record in a record of the replicated database.

35. The method of claim 33, wherein the sending step further comprises sending the replication message to at least one other computer of the plurality as part of an update to the copy of the replicated database being maintained by the other computer.

36. The method of claim 33, wherein the replication message is sent to a direct partner of the computer.

37. A computer readable medium having stored thereon computer-executable instructions for performing the steps of claim 33.

38. A computer readable medium having stored thereon computer-executable instructions for performing the steps of claim 34.

39. A computer readable medium having stored thereon computer-executable instructions for performing the steps of claim 35.

40. A computer readable medium having stored thereon computer-executable instructions for performing the steps of claim 36.

41. A computer-implemented method of administering a plurality of computer systems in a computer network comprising:

creating a command record in a database located at a first of the plurality of computer systems, the command record comprising:

an administrative command; and an administrative command execution schedule;

replicating the database to at least one database of a same type located at each of at least one other of the plurality of computer systems; and at each of the plurality of computer systems, executing the administrative command of the replicated command record in accordance with the administrative command execution schedule of the replicated command record.

42. The computer-implemented method of claim 41, wherein:

the command record further comprises a specification of a subset of the plurality of computer systems; and the administrative command of the replicated command record is executed in accordance with the administrative command execution schedule of the replicated command record by the computer system if the computer system is in the subset of the plurality of computer systems specified by the specification of the subset of the plurality of computer systems of the replicated command record.

43. The computer-implemented method of claim 41, wherein:

each computer system hosts a WINS server;

each database is a WINS database; and replication is carried out in accordance with a WINS database replication protocol.

44. The computer-implemented method of claim 41, further comprising, at each of the plurality of computer systems, deleting the replicated command record if the administrative command execution schedule of the replicated command record indicates that the administrative command of the replicated command record is no longer scheduled to be executed.

* * * * *

UNITED STATES PATENT AND TRADEMARK OFFICE
CERTIFICATE OF CORRECTION

PATENT NO. : 6,782,398 B1
DATED : August 24, 2004
INVENTOR(S) : Pradeep Bahl

Page 1 of 1

It is certified that error appears in the above-identified patent and that said Letters Patent is hereby corrected as shown below:

Title page,
Item [56], References Cited, U.S. PATENT DOCUMENTS, insert
-- 5,913,213     06-1999          Wikstrom et al.          707/8
   6,182,117 B1 01-2001          Christie et al.          709/205 --

Column 10,
Line 28, delete "fiber" and insert -- further --.

Signed and Sealed this

Fourteenth Day of June, 2005

JON W. DUDAS
*Director of the United States Patent and Trademark Office*